United States Patent [19]

Tanaka et al.

[11] Patent Number: 4,887,632
[45] Date of Patent: Dec. 19, 1989

[54] FLOW CONTROL APPARATUS

[75] Inventors: Tadao Tanaka; Takeshi Mitsui; Shozo Takizawa; Kazuo Fukuyama, all of Okazaki, Japan

[73] Assignee: Mitsubishi Jidosha Kogyo Kabushiki Kaisha, Tokyo, Japan

[21] Appl. No.: 195,590

[22] Filed: May 18, 1988

[30] Foreign Application Priority Data

| May 20, 1987 | [JP] | Japan | 62-75639[U] |
| Dec. 21, 1987 | [JP] | Japan | 62-193866[U] |
| Feb. 26, 1988 | [JP] | Japan | 63-24664[U] |

[51] Int. Cl.⁴ .................. G05D 11/00; F16D 31/02; B62D 5/06
[52] U.S. Cl. .................. 137/117; 60/468; 91/446; 180/132; 180/140; 180/143; 417/300
[58] Field of Search .................. 417/300, 307, 310; 180/140, 143, 132; 137/117; 60/468, 494; 91/446, 448

[56] References Cited

U.S. PATENT DOCUMENTS

| 4,320,812 | 3/1982 | Takaoka et al. | 180/143 |
| 4,343,324 | 8/1982 | Ohe et al. | 137/117 |
| 4,400,938 | 8/1983 | Ohe | 137/117 X |
| 4,420,934 | 12/1983 | Udono | 137/117 X |
| 4,505,293 | 3/1985 | Strange | 137/117 |
| 4,534,435 | 8/1985 | Shibahata et al. | 180/140 |
| 4,577,728 | 3/1986 | Gruett | 184/80 X |
| 4,716,982 | 1/1988 | Ishii et al. | 180/140 |

FOREIGN PATENT DOCUMENTS

| 110570 | 5/1987 | Japan | 180/140 |
| 110571 | 5/1987 | Japan | 180/140 |
| 110572 | 5/1987 | Japan | 180/140 |
| 2174653 | 11/1986 | United Kingdom | 180/143 |

Primary Examiner—Edward K. Look
Attorney, Agent, or Firm—Hedman, Gibson, Costigan & Hoare

[57] ABSTRACT

A flow control valve includes a cylinder in which an inflow port, an outflow port and a return port are formed. A spiral choke is formed between the inflow and outflow ports. A working oil introduced from the inflow port into the cylinder flows out from the outflow port through the spiral choke. An actuating valve is arranged in the cylinder so as to open and close the return port in accordance with a difference in pressure between the inflow and outflow port sides of the spiral choke. When the pressure difference exceeds a predetermined value, the actuating valve opens the return port so that a part of the working oil introduced into the cylinder is returned to the inflow side of the flow control valve.

11 Claims, 5 Drawing Sheets

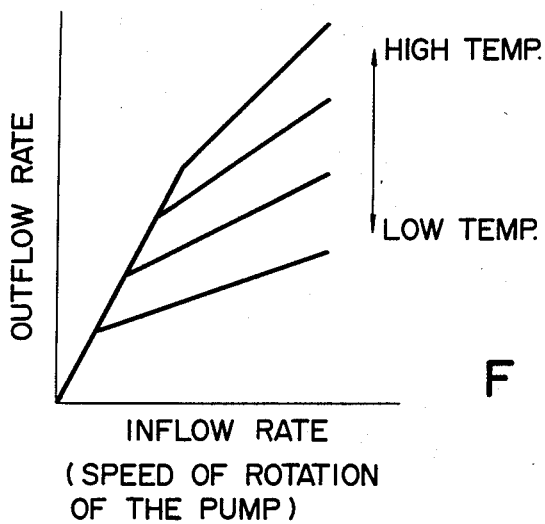
F I G. 5
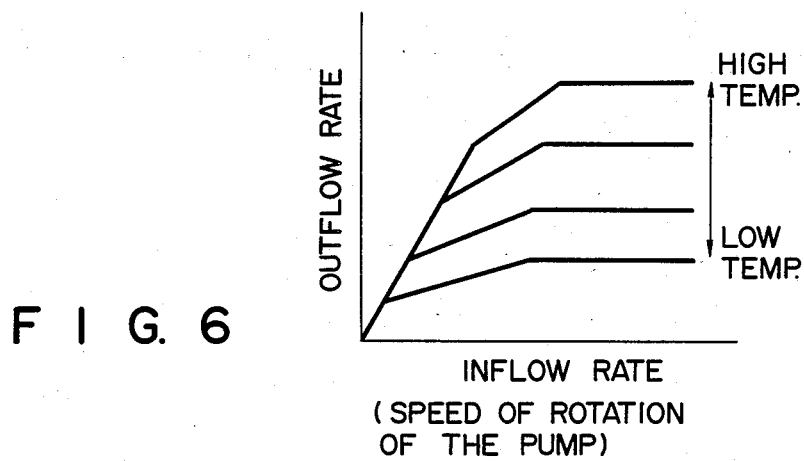
F I G. 6
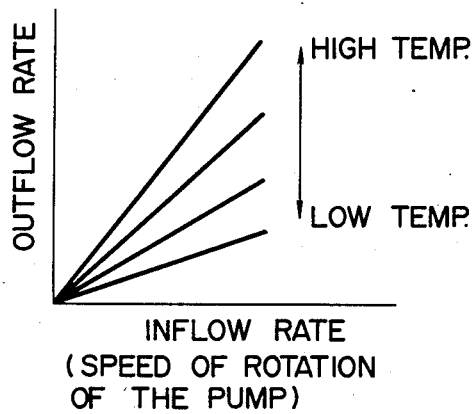
F I G. 7

FLOW CONTROL APPARATUS

BACKGROUND OF THE INVENTION

1. Field of the invention

The present invention relates to a flow control apparatus used in a hydraulic system.

2. Description of the Related Art

Recently, a four-wheel steering system in a vehicle is known as a hydraulic system. This system comprises a power steering device for steering front wheels by generating an oil pressure in accordance with turning of a steering wheel, a hydraulic actuator for steering rear wheels, and an oil pump arranged to be driven by, e.g., a rear-wheel differential mechanism and adapted to generate an oil pressure in accordance with a vehicle speed. A control valve is arranged in a hydraulic circuit connecting the oil pump to the hydraulic actuator. The control valve is designed so as to switch the hydraulic circuit in accordance with the oil pressure generated by the power steering device.

According to the four-wheel steering system with the above-described arrangement, the rear wheels can be steered in the same direction as the front wheels by the oil pressure generated by the oil pump while the vehicle is moving at high speed. As a result, traveling stability of the vehicle during a high-speed traveling mode can be improved. However, in a four-wheel steering system with such an arrangement, the amount of oil delivered from the oil pump is increased with an increase in vehicle speed. For this reason, the generated oil pressure of the oil pump is excessively increased within a vehicle speed range exceeding a certain speed level, thereby steering the rear wheels at an excessive steering angle and degrading durability of the hydraulic circuit. A flow control valve is easily used as means for solving such problems. The flow control valve serves to return part of working oil to the suction side of the oil pump by opening a return path when the amount of oil delivered from the oil pump exceeds a predetermined value.

The viscosity of a working oil flowing through hydraulic circuits in hydraulic systems varies depending on the oil temperature, although this problem is not limited only to such a hydraulic four-wheel steering system as described above. When the oil temperature is low, the viscosity of the working oil is high, whereas when it is high, the viscosity of the working oil becomes low. For this reason, in the above-described arrangement, even if the vehicle speed is the same (the delivery amount of the working oil from the oil pump is the same), a generated oil pressure is much higher when the oil temperature is low than when the oil temperature is high. That is, the steering angle of the rear wheels, which is determined in accordance with the oil pressure applied to the hydraulic actuator, is changed by the oil temperature, and hence steering characteristic of the rear wheels is changed by the temperature of the working oil.

SUMMARY OF THE INVENTION

The present invention has been made in consideration of the above situation, and has as its object to provide a flow control apparatus for a hydraulic system, which can compensate for a change in a generated oil pressure according to a change in viscosity of the working oil caused by a temperature change thereof.

In order to achieve the above object, according to the present invention, there is provided a flow control apparatus, comprising inflow port means into which a working oil flows, outflow port means from which the working oil flows out, return port means for returning part of the working oil, elongate throttling path means for causing the inflow port means to communicate with the outflow port means, and actuating valve means arranged to be movable in response to the pressure difference between upstream and downstream sides of the throttling path means, for opening and closing of the return port means, thereby opening the return port means when the pressure difference exceeds a predetermined value.

More specifically, the flow resistance of the working oil flowing through the throttling path means is greatly changed in accordance with changes in temperature of the working oil, i.e., changes in viscosity. For this reason, the pressure difference between the upstream and downstream of the throttling path means at a constant flow rate decreases with an increase in the oil temperature. Therefore, the flow rate of the working oil required to cause the actuating valve, which is operated in accordance with the pressure difference to open the return port means increases with an increase in the oil temperature. According to the invention, when the oil temperature is low, an outflow rate is controlled to be decreased by the flow control apparatus. When the oil temperature is high, the outflow rate is controlled to be increased. Since the flow rate is increased with an increase in the oil temperature, changes in the oil pressure under the influence of changes in the viscosity due to changes in the oil temperature is compensated by changes in controlled outflow rate. As a result, the generated oil pressure can be stabilized with respect to changes in the oil temperature.

In addition, the present invention comprises throttle path control means for shortening an effective length of the throttling path means, in accordance with a displacement of the actuating valve in such a direction wherein the valve opens the return port means.

In this case, since the effective length of the throttling path means is shortened by the control means when the return port is opened, a difference in pressure between the upstream and downstream sides of the throttling path means decreases and the actuating valve means moves in a direction closing the return port means. As a result, the amount of working oil returning from the return port means decreases, and a substantial opening degree of the return port means increases with an increase in the outflow rate. Therefore, the outflow rate can be changed in accordance with changes in the oil temperature, and the outflow rate can be increased with an increase in the inflow rate. As a result, the oil pressure corresponding to the inflow rate can be generated while the generated oil pressure is stabilized regardless of changes in the oil temperature.

BRIEF DESCRIPTION OF THE DRAWINGS

FIGS. 4 to 6 show a flow control apparatus according to a second embodiment of the present invention, in which FIG. 4 is a longitudinal view of the apparatus, and FIGS. 5 and 6 are graphs showing flow characteristics of the apparatus;

FIG. 7 is a graph showing an ideal flow characteristic of the apparatus with respect to oil temperatures.

DETAILED DESCRIPTION OF THE PREFERRED EMBODIMENTS

Figure 1:
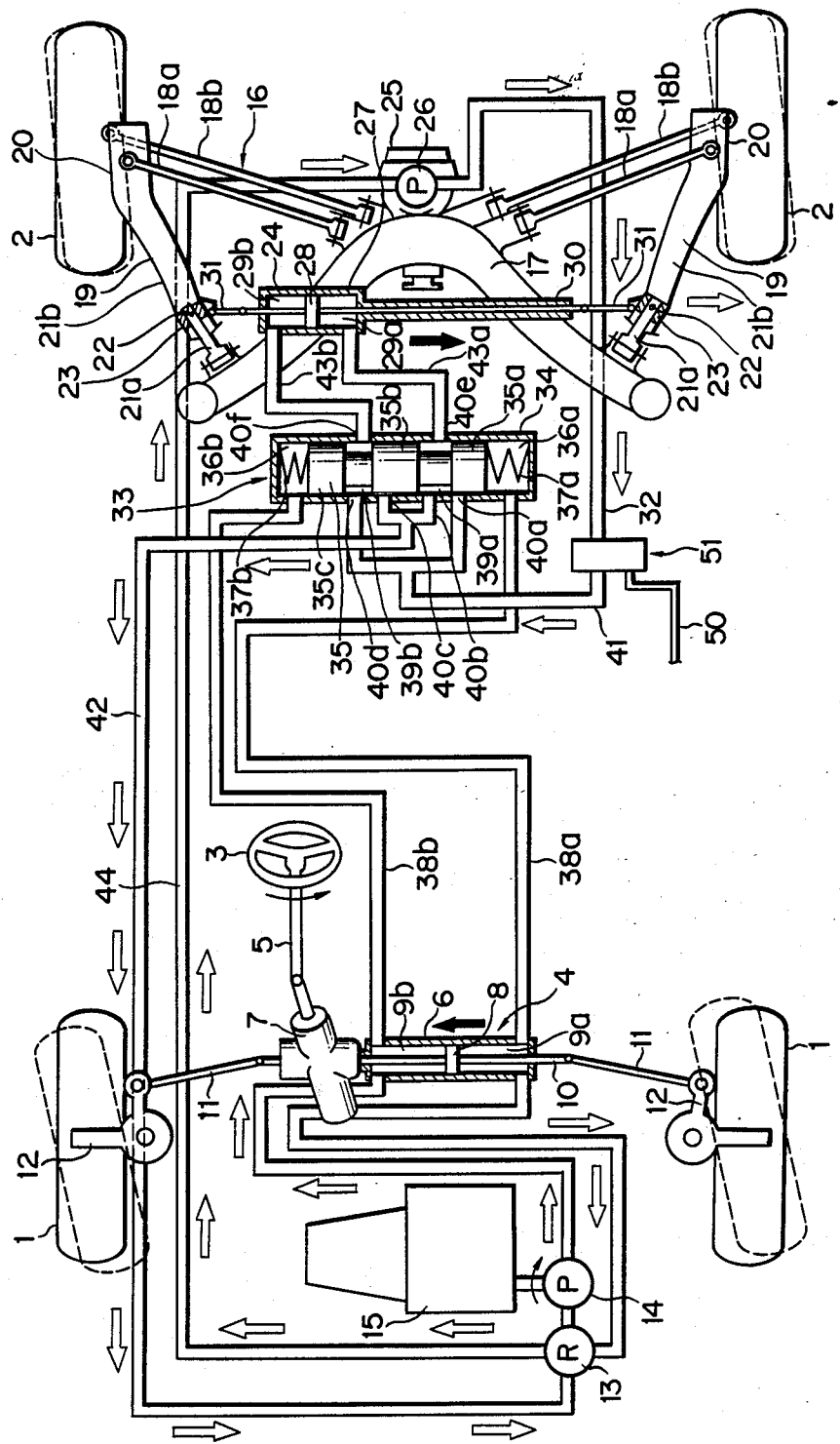
FIG. 1 is a plan view of a four-wheel steering system having a flow control apparatus according to an embodiment of the present invention.

FIG. 1 shows a four-wheel steering system installed in a vehicle and provided with a flow control apparatus according to a first embodiment of the present invention. The vehicle comprises a pair of front wheels 1 and a pair of rear wheels 2. Front wheels 1 are steered by steering wheel 3 through power steering device 4. Steering wheel 3 is coupled to power cylinder 6 of the power steering device through steering shaft 5 and steering gear box 7.

The interior of power cylinder 6 is partitioned into left and right chambers 9a and 9b by piston 8. Two end portions of piston rod 10 of piston 8 are coupled through tie rods 11 to knuckle arms 12 for supporting front wheels 1. Steering gear box 7 is connected to reservoir tank 13 of power steering device 4 and oil pump 14. In this case, oil pump 14 is driven by engine 15.

Rear suspension 16 of the vehicle is constituted by cross member 17, two pairs of upper and lower lateral arms (upper and lower arms 18a and 18b), and a pair of trailing arms 19. Outer end portions of each pair of upper and lower arms 18a and 18b are coupled to corresponding rear-wheel support member 20 for supporting rear wheel 2, and inner end portions of arms 18a and 18b are coupled to the central portion of cross member 17. A leading end portion of each trailing arm 19 is coupled to one of the outer end portions of cross member 17, and its trailing end portion is fixed to rear-wheel support member 20. Each trailing arm 19 is divided into front and rear arms 21a and 21b. Front and rear arms 21a and 21b are pivotally coupled by substantially vertical pivot shaft 22. Elastic member 23 such as rubber is attached between each leading end portion of rear arm 21b and the corresponding trailing end portion of front arm 21a.

The four-wheel steering system comprises hydraulic actuator 24 for steering the rear wheels, and oil pump (oil pressure source) 26, driven by a gear arranged in rear-wheel differential device 25, for steering the rear wheels. Hydraulic actuator 24 is fixed to cross member 20 along the widthwise direction of the vehicle. Hydraulic actuator 24 comprises hydraulic cylinder 27. The interior of hydraulic cylinder 27 is partitioned into left and right chambers 29a and 29b by piston 28. Two end portions of piston rod 30 of piston 28 are coupled to the leading end portions of corresponding rear arms 21b through tie rods 31.

Control valve 33 is interposed midway along hydraulic circuit 32 for connecting between hydraulic actuator 24 and oil pump 26. Control valve 33 is constituted by sleeve 34 and spool 35 arranged therein to be movable in the axial direction. Pilot signal pressure chambers 36a and 36b are respectively defined at the left and right end portions of sleeve 34. Spring members 37a and 37b are respectively arranged in pilot signal pressure chambers 36a and 36b so as to hold spool at the neutral position. Left pilot signal pressure chamber 36a is connected to left chamber 9a of power cylinder 6 through connecting path 38a, whereas right pilot signal pressure chamber 36b is connected to right chamber 9b of power cylinder 6 through connecting path 38b. Lands 35a, 35b, and 35c are formed on the outer periphery of spool 35. First and second valve chambers 39a and 39b each having a small diameter are respectively defined between lands 35a and 35b, and between lands 35b and 35c. First, second, third, fourth, fifth, and sixth ports 40a, 40b, 40c, 40d, 40e, and 40f are formed in sleeve 34. In this case, while spool 35 is held at the neutral position, first, second, and fifth ports 40a, 40b, and 40e of sleeve 34 communicate with first valve chamber 39a of spool 35, and third, fourth, and sixth ports 40c, 40d, and 40f communicate with valve chamber 39b. First and fourth ports 40a and 40d are connected to the delivery port of oil pump 26 through oil introducing path 41 of hydraulic circuit 32. Second and third ports 40b and 40c are connected to reservoir tank 13 through return path 42. Furthermore, fifth port 40e is connected to left chamber 29a of hydraulic cylinder 27 through first oil path 43a of hydraulic circuit 32, and sixth port 40f is connected to left chamber 29b of hydraulic cylinder 27 through second oil path 43b. Note that the suction port of oil pump 26 communicates with reservoir tank 13 through connecting path 44.

Piston 8 in power cylinder 6 of power steering device 4 is held at the neutral position during straight traveling of the vehicle, wherein steering wheel 3 is held at the neutral position. For this reason, the pressures in pilot signal pressure chambers 36a and 36b of control valve 33 are held to be equal to each other, and hence spool 35 is held at the neutral position. Therefore, an oil pressure is not applied to hydraulic actuator 24 so that rear wheels 2 are held in the straight traveling state as indicated by solid lines in FIG. 1.

When the vehicle is to be turned left while moving at, rotational power of steering wheel 3 is transmitted to steering gear box 7 through steering shaft 5 upon steering of steering wheel 3. Then, by the operation of power steering device 4, light pressure oil is supplied to left chamber 9a of power cylinder 6 and piston 8 in the power cylinder is moved from the neutral position to the right. As a result, knuckle arms 12 are interlocked with the motion of piston 8 through piston rod 10 and tie rods 11, and are rotated in the counterclockwise direction, thereby steering front wheels 1 to the left as indicated by broken lines in FIG. 1. At this time, the oil pressure in left chamber 9a in power cylinder 6 becomes higher than that in right chamber 9b. Then, the oil pressure in left pilot signal pressure chamber 36a of control valve 33 becomes higher than that in right pilot signal pressure chamber 36b. As a result, spool 35 of control valve 33 is moved in the right as is shown in FIG. 1. Subsequently, first and third ports 40a and 40c are throttled by lands 35a and 35b of spool 35, and control valve 33 is switched to a state wherein first valve chamber 39a of spool 35 communicates with second and fifth ports 40b and 40e, and second valve chamber 39b of spool 35 communicates with fourth and sixth ports 40d and 40f of sleeve 34. As a result, the working oil delivered from oil pump 26 is introduced into right chamber 29b of hydraulic cylinder 27 through oil introducing path 41 and second oil path 43b of hydraulic circuit 32 in the order named, so that right chamber 29b of hydraulic cylinder 27 is set in a high-pressure state. In addition, left chamber 29a of hydraulic cylinder 27 communicates with reservoir tank 13 through first oil path 43a and return path 42, and is set in a low-pressure state. Thus, piston 28 of hydraulic cylinder 27 is moved in the left, and the leading end portions of rear arms 21b are interlocked with the motion of piston 28 through piston rod 30 and tie rods 31 and are urged to the left, thereby steering rear wheels 2 in the left. As described above, rear wheels 2 are steered in the same direction as the front wheels, thereby improving the traveling stability of the vehicle in the high-speed traveling upon turning of the steering wheel.

When the vehicle is to be turned to the left while moving at low-speed traveling, high-pressure oil is supplied to right chamber 9b of power cylinder 6, upon the steering operation of steering wheel 3. Thus, piston 8 in power cylinder 6 is moved from the neutral position to the right. As a result, interlocking with piston 8, knuckle arms 12 are pivoted in the counterclockwise direction through piston rod 10 and tie rods 11, thereby steering front wheels 1 in the left as indicated by the broken lines in FIG. 1. In this case, the oil pressure in left chamber 9a in power cylinder 6 becomes higher than in right chamber 9b. Then, the oil pressure in left pilot signal pressure chamber 36a of control valve 33 becomes higher than that in right pilot signal pressure chamber 36b. For this reason, spool 35 is moved in the right, however, during the low-speed traveling, the delivery amount of oil from oil pump 26 rotated in accordance with a vehicle speed is small, and hence the generated oil pressure is also low. Therefore, rear wheels 2 are not steered and held at the neutral position.

As is shown in FIG. 1, flow control apparatus 51 according to the present invention is arranged in oil introducing path 41 of hydraulic circuit 32 which connects oil pump 26 to control valve 33.

Figure 2:
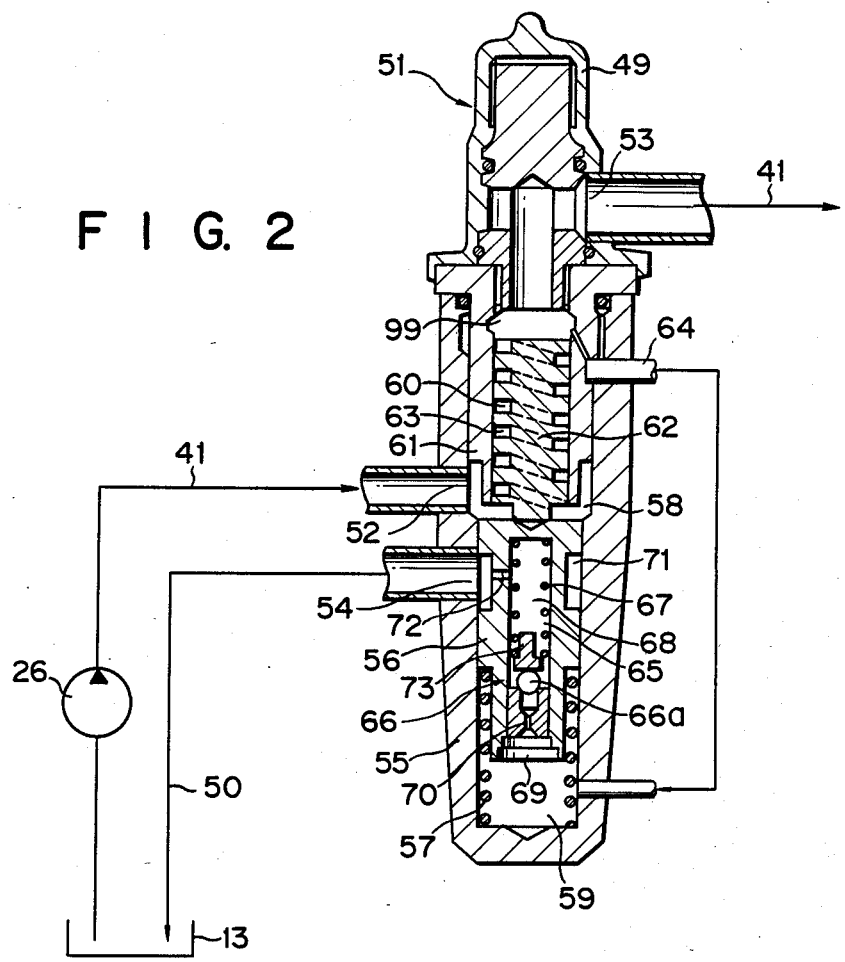
FIG. 2 is a longitudinal sectional view of the flow control apparatus.

As is shown in FIG. 2, valve 51 includes cylinder 55 whose lower end is closed, and cylindrical cover 49 fixed to the upper end of cylinder 55. Inflow port 52 and return port 54 are formed in the outer periphery of cylinder 55. Outflow port 53 is formed in the outer periphery of cover 49. Inflow port 52 is located closer to return port 54 than to outflow port 53. Inflow and outflow ports 52 and 53 are respectively connected to oil pump 26 and control valve 33 through path 41, and return port 54 is connected to reservoir tank 13 through pipe 50.

Actuating valve (spool) 56 for opening and closing return port 54 and flow control spring 57 for biasing actuating valve 56 toward a closing position (FIG. 2), wherein valve 56 closes return port, are arranged in cylinder 55. In this case, the interior of cylinder 55 is partitioned into first pressure chamber 58 and third pressure chamber (flow control spring storage chamber) 59 by actuating valve 56. First pressure chamber 58 communicates with inflow port 52. Flow control spring 57 is formed of a compression spring and is arranged in third pressure chamber 59.

Spiral choke (elongate throttling path) 60 for throttling a flow path area is arranged between first pressure chamber 58 and outflow port 53. More specifically, sleeve 61 is fitted in the upper portion of cylinder 55, and column 62 is fitted into sleeve 61. Spiral choke 60 is constituted by spiral grooves 63 formed on the outer periphery of column 62. Second pressure chamber 99 is defined between an opening of the downstream side of spiral choke 60 and outflow port 53. Second pressure chamber 99 is connected to third pressure chamber 59 through communicating path 64.

Relief path 65 is formed in actuating valve 56 of flow control valve 51 to cause third pressure chamber 59 to communicate with return port 54 when actuating valve 56 is held at the closing position. More specifically, relief valve chamber 68 extending in the axial direction is formed in actuating valve 56. Oil inflow opening 69 is formed in that end face of valve 56 which is located at the side of third pressure chamber 59. Opening 69 communicates with relief valve chamber 68 through small-diameter oil path 70. Annular groove 71 is formed in the outer periphery of actuating valve 56. Annular groove 71 communicates with relief valve chamber 68 through small hole 72. In this case, annular groove 71 is formed to oppose return port 54 when actuating valve 56 is held at the closing position. Relief path 65 is constituted by oil inflow opening 69, oil path 70, relief valve chamber 68, small hole 72, and annular groove 71.

Relief valve 66 for closing relief path 65 is arranged in relief valve chamber 68. Relief valve 66 includes valve body 66a and relief valve spring 67. Valve body 66a is formed of a ball valve having a diameter larger than that of oil path 70. Spring 67 is arranged in valve chamber 68 so as to bias valve body 63a through pressing member 73 in a direction of closing oil path 70. The biasing force of spring 67 is set to be a predetermined value. When the pressure of the working oil delivered from oil pump 26 exceeds the predetermined value, valve 66 is opened to cause relief path 65 to communicate with third pressure chamber 59. Therefore, the upper limit of the pressure of working oil to be supplied from oil pump 26 to control valve 33 can be set by adjusting the biasing force of spring 67.

The operation of the flow control apparatus with the above-described arrangement will be described.

While the vehicle is moving, the working oil delivered from oil pump 26 flows through oil introducing path 41 of hydraulic circuit 32, first pressure chamber 58 of flow control valve 51, spiral choke 60, second pressure chamber 99, and outflow port 53, and is introduced into control valve 33. Part of the working oil passed through spiral choke 60 and flowing into second pressure chamber 98 is introduced into third pressure chamber 59 through connecting path 64.

Since spiral choke 60 is arranged between first and second pressure chambers 58 and 99, a difference in pressure is generated between these pressure chambers. In addition, since second pressure chamber 99 communicates with third pressure chamber 59 through connecting path 64, the same pressure difference as described above is generated between first and third pressure chambers 58 and 59. When the amount of oil delivered from oil pump 26 is small, e.g., when oil pump 26 is operated at a low speed, the pressure difference between first and third pressure chambers 58 and 59 is small. For this reason, actuating valve 56 is held at the position of closing return port 54 by biasing force Kst of flow control spring 57. As a result, most part of the working oil delivered from oil pump 26 is introduced to the control valve 33 through oil introducing path 41 of hydraulic circuit 32, first pressure chamber 58 of flow control valve 51, spiral choke 60, second pressure chamber 99, and outflow port 53. When the speed of oil pump 26 increases with an increase in vehicle speed, the delivery amount of oil from oil pump 26 is also increased. Therefore, the flow rate of oil flowing into flow control valve 51 increases, and the pressure difference (a force for moving actuating valve 56 downward) between first and third pressure chambers 58 and 59 increases. When this pressure difference exceeds biasing force Kst of flow control spring 57, actuating valve 56 moves downward in FIG. 2, thereby causing first pressure chamber 58 to communicate with return port 54. In this case, part of the working oil introduced in first pressure chamber 58 is returned to reservoir tank 13 through return port 54. Therefore, the flow rate of working oil flowing from oil pump 26 to the control valve 33 is held at substantially constant flow rate Q after rotational speed N of oil pump 26 exceeds a predetermined value, i.e., when the vehicle speed exceeds a predetermined value.

Figure 3:
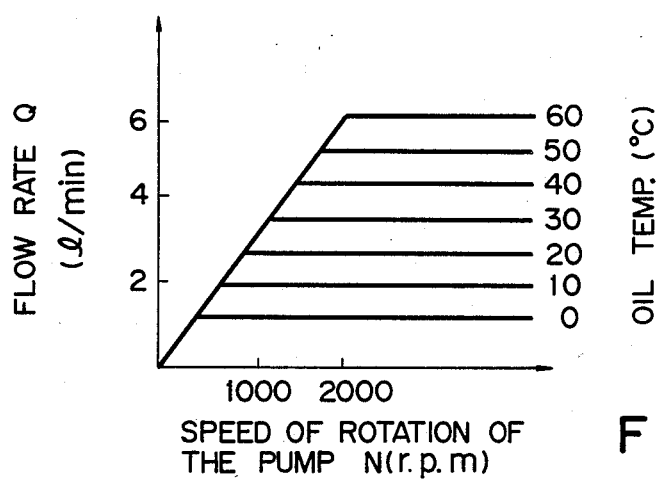
FIG. 3 is a graph showing a flow characteristic of the flow control apparatus with respect to oil temperature.

The working oil introduced into first pressure chamber 58 of flow control valve 51 is introduced into the control valve 33 while the oil pressure is decreased by spiral choke 60. For this reason, changes in viscosity of the working oil corresponding to changes in the oil temperature greatly influence the flow resistance of the working oil flowing through spiral choke 60. More specifically, the flow resistance is low when the oil temperature is high, and is high when the oil temperature is low. For this reason, the differences in pressure generated between first pressure chamber 58, and second and third pressure chambers 99 and 59 are decreased when the oil temperature is high, and are increased when the oil temperature is low. The flow rate for generating the pressure difference required to cause actuating valve 56 to open return port 54 is increased with an increase in the oil temperature. That is, the flow rate of the working oil can be greatly changed in accordance with the oil temperature by providing spiral choke 60. As is shown in FIG. 3, the flow rate of the working oil supplied from oil pump 26 to control valve 33 can be increased with an increase in the oil temperature. Therefore, even if the oil temperature is low, the amount of oil supplied to control valve 33 decreases, and the increase in the generated pressure due to the influence of the viscosity can be canceled by the decreased flow rate. As a result, the degree of changes in the generated oil pressure in accordance with changes in the oil temperature is reduced, thereby minimizing the degree of changes in steering characteristic of rear wheels 2 with respect to the temperature of the working oil. That is, changes in the oil pressure caused by changes in viscosity according to changes in the oil temperature can be compensated by controlling the flow rate in accordance with the oil temperature. As a result, the generated oil pressure is stabilized.

Furthermore, when the flow pressure of the working oil flowing out from flow control valve 51 through outflow port 53 increases, the pressure in third pressure chamber 59 also increases. When the pressure in third pressure chamber 59 exceeds the set load, i.e., the biasing force of relief valve spring 67, relief valve 66 is opened, so that part of the working oil in third pressure chamber 59 is returned to reservoir tank 13 through relief path 65. When the pressure in third pressure chamber 59 is decreased upon outflow of the working oil returned into reservoir tank 13 through relief path 65, relief valve 66 is closed again. For this reason, the pressure in third and second pressure chambers 59 and 99 can be sequentially decreased through communicating path 64 upon opening of relief valve 66. Therefore, the outflow pressure of the oil from flow control valve 51, i.e., the delivery pressure of the working oil supplied from oil pump 26 to control valve 33 can be prevented from exceeding the upper limit of pressure set by relief valve 66.

Figure 4:
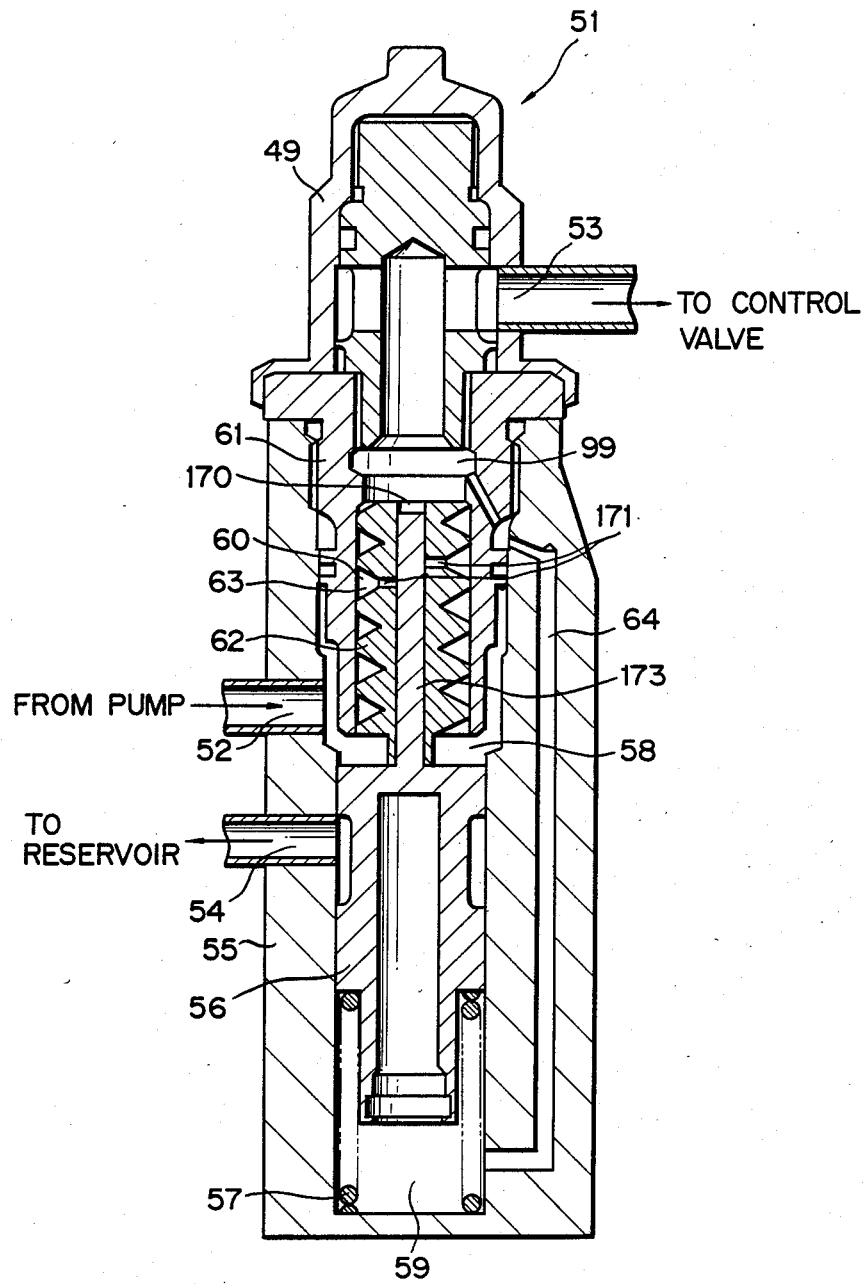

FIG. 4 shows a flow control valve according to a second embodiment of the present invention. In the second embodiment, the same reference numerals as in the first embodiment denote the same parts as in the first embodiment, and a detailed description thereof will be omitted.

Spiral choke 60 serving as an elongate spiral throttling path for throttling a flow path area is arranged between first and second pressure chambers 58 and 59 of flow control valve 51. Spiral choke 60 is constituted by the inner peripheral surface of sleeve 61 fitted in the upper portion of cylinder 55, and spiral grooves 63 formed on the outer peripheral surface of column 62 fitted into sleeve 61. Bypath passage 170 opening to the second pressure chamber 99 is formed in the central portion of column 62. Bypath passage 170 communicates with intermediate portions of spiral choke 60 through a plurality of bypath ports 171 (only two ports are shown in FIG. 4) formed in column 62 spaced apart from one another in the axial direction of column 62 spaced apart.

Rod section 173 extends from the upper end of actuating valve 56 and is slidably inserted into bypath passage 170. When actuating valve 56 is located at a position of closing return port 54, rod section 173 closes all bypath ports 171. Rod section 173 sequentially opens bypath ports 171 as actuating valve 56 moves downward to increase the opening degree of return port 54.

The operation of the second embodiment with the above-described arrangement will be described.

When the difference in pressure (a force to move the valve body downward) between first and third pressure chambers 58 and 59 exceeds biasing force Kst of flow control spring 57 according to the increase in the delivery amount of oil from oil pump 26, actuating valve 56 is urged downward in FIG. 4. Thus, first pressure chamber 58 communicates with return port 54, and then part of the working oil introduced into first pressure chamber 58 is returned to the reservoir tank 13 from return port 54. When return port 54 is opened upon displacement of actuating valve 56, bypath ports 171 are simultaneously opened by rod section 173. Therefore, part of the working oil flowing through spiral choke 60 flows out from bypath ports 171 to second pressure chamber 99 through bypath passage 170. Then, the effective length of spiral choke 60 is shortened, and the pressure difference pressure between the upstream and downstream sides of spiral choke 60, i.e., between first and second chambers 58 and 99 is decreased. As a result, actuating valve 56 is moved upward, return port 54 is closed, and bypath ports 171 are closed, so that the pressure difference again increases. When the inflow rate of the working oil from oil pump 26 increases to a certain level, actuating valve 56 repeats opening and closing of return port 54 and bypath 170.

When the inflow rate further increases, the pressure difference between the upstream and downstream sides of spiral choke 60 is further increased, so that actuating valve 56 tends to increase the opening degree of return port 54. However, when actuating valve 56 is greatly moved downward, the number of bypath ports to be opened increases. Thus, the difference in pressure between the upstream and downstream of spiral choke 60 greatly decreases and actuating valve 56 is moved upward. Similar to the case described above, actuating valve 56 repeats opening and closing of return port 54 and bypath 70. Accordingly, in the range of the inflow rates for causing return port 54 to be opened, the working oil is returned from return port 54 to the reservoir tank at substantially a constant ratio with respect to the inflow rate, and the outflow rate increases in accordance with an increase in the inflow rate.

In addition, the working oil introduced in first pressure chamber 58 of flow control valve 51 is introduced into the control valve 33 while the pressure of the working oil is decreased by spiral choke 60. For this reason, similar to the first embodiment, the flow resistance of the working oil flowing through spiral choke 60 is decreased when the oil temperature is high, and is increased when the oil temperature is low. As a result, the pressure difference generated between the upstream side (the first pressure chamber 58 side) and downstream side (the second and third pressure chamber 59 and 99 side) of spiral choke 60 decreases when the oil temperature is low, and increases when the oil temperature is high. Therefore, the inflow rate for generating a pressure difference causing return port 54 to start opening is increased with an increase in the oil temperature. In addition, the difference in pressure between the upstream and downstream sides of spiral choke 60 increases with a decrease in the oil temperature. Therefore, within the range of the inflow rate for causing return port 54 to be opened, the ratio of the working oil to be returned from return port 54 to the reservoir side, with respect to the inflow rate, is increased with a drop in the oil temperature. In other words, the ratio of the outflow rate from valve 51 with respect to an increase in the inflow rate to valve 51 increases in accordance with an increase in the oil temperature.

Since the flow resistance of the working oil can be greatly changed in accordance with the oil temperature by means of spiral choke 60, the controlled flow rate of the working oil supplied from oil pump 26 to the control valve 33 can be increased in accordance with an increase in the oil temperature and inflow rate, as is shown in FIG. 5. In the first embodiment described above, unlike the ideal characteristic shown in FIG. 7, oil temperature dependency cannot be effectively used to change the outflow rate in accordance with the inflow rate. Thus, the outflow rate characteristic corresponding to the inflow rate cannot be obtained within the range wherein the oil temperature dependency is generated (the region for allowing the return port to be opened). However, in the second embodiment, the outflow rate characteristic can be approximate to the ideal characteristic shown in FIG. 7.

Therefore, even if the temperature of the working oil is low, an increase in the generated oil pressure due to the influence of the viscosity can be canceled by a decrease in the outflow rate, by decreasing the amount of oil to be supplied to control valve 33. As a result, the degree of changes in the generated oil pressure due to the oil temperature can be decreased, so that the degree of changes in the steering characteristic of rear wheels 2 according to changes in the oil temperature can be decreased. Furthermore, the outflow rate can be changed with including the influence of the oil temperature. At the same time, an outflow rate characteristic corresponding to the inflow rate characteristic can be obtained. Accordingly, in the four-wheel steering system shown in FIG. 1, the characteristic of rear-wheel steering angle corresponding to the vehicle speed can be kept constant regardless of the oil temperature.

Note that in the second embodiment, the flow rate characteristic shown in FIG. 6 can be obtained by, e.g., adjusting the heights of formation positions of bypath ports 171, i.e., adjusting the relationship between the positions of bypath ports 171 and the stroke of rod section 73.

Figure 8:
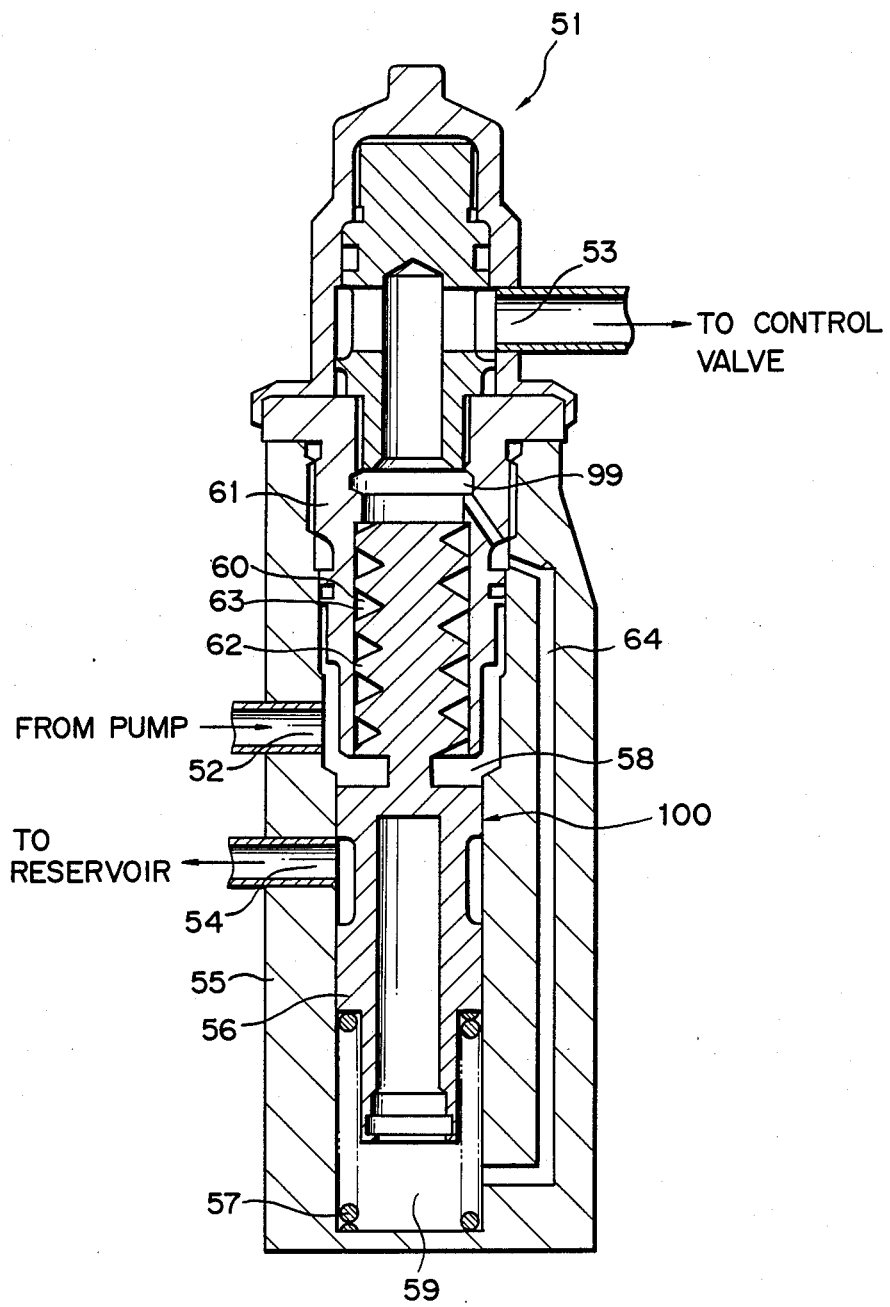
FIG. 8 is a longitudinal view of a flow control apparatus according to a third embodiment of the present invention.

FIG. 8 shows a flow control valve according to a third embodiment of the present invention. The same reference numerals in the third embodiment denote the same parts as in the first and second embodiments, and a detailed description thereof will be omitted.

According to this embodiment, spiral choke 60 arranged between first and second pressure chambers 58 and 99 of flow control valve 51 is constituted by sleeve 61 fitted in the upper portion of cylinder 55, and spiral grooves 63 formed in the outer periphery of column 62 slidably inserted into sleeve 61. The lower end of column 62 is coupled to the upper portion of actuating valve 56 to be slidable together with actuating valve 56.

The operation of the third embodiment will be described.

When the difference in pressure between first and third pressure chambers 58 and 59 increases with an increase in delivery amount of oil from oil pump 26, actuating valve 56 tends to move downward. However, when actuating valve 56 is moved downward, the overlapping amount of sleeve 61 and column 62 is decreased, thereby shortening the effective length of choke 60. As a result, the pressure difference is decreased, and actuating valve 56 tends to be returned to the original position by spring 57. When the inflow rate further increases, control spool 100 consisting of actuating valve 56 and column 62 gradually move downward while the above operation is repeated, so that return port 54 is eventually opened. When return port 54 is open, part of the working oil introduced in first pressure chamber 58 is returned from return port 54 to reservoir tank 13. However, when return port 54 is opened by actuating valve 56, the amount of oil flowing through spiral choke 60 is decreased and the effective length of spiral choke is shortened. For this reason, the pressure difference between the upstream and downstream sides of spiral 60 is decreased. As a result, actuating valve 56 moves upward to close return port 54, and the effective length of spiral choke 60 is increased again. Thus, the pressure difference increases. As described above, when the inflow rate of the oil from oil pump 26 increases to a certain level, actuating valve 56 repeats opening/closing of return port 54.

When the inflow rate further increases, the difference in pressure between the upstream and downstream sides of spiral choke 60 is further increased, so that actuating valve 56 tends to further open return port 54. However, when actuating valve 56 is greatly moved downward, the effective length of spiral choke 60 is greatly decreased. As a result, the difference in pressure between the upstream and downstream of spiral choke 60 is greatly decreased, and actuating valve 56 is moved upward. Similar to the case described above, actuating valve 56 repeats opening/closing of return port 54.

Therefore, within the range of inflow rate for allowing the return port to be opened the working oil is returned from return port 54 to the reservoir side at a substantially constant ratio with respect to the inflow rate, thereby increasing the outflow rate in accordance with the increase in the inflow rate.

The working oil introduced in first pressure chamber 58 of flow control valve 51 is introduced into the control valve 33 while the pressure of the working oil is decreased by spiral choke 60. For this reason, similar to the first and second embodiments, the inflow rate necessary for generating the pressure difference causing return port 54 to be opened is increased with an increase in the oil temperature. Since the difference in pressure between the upstream and downstream sides of spiral choke 60 increases with the decrease in the oil temperature, within the range of the inflow rate for allowing return port 54 to be opened, the ratio of the working oil to be returned from return port 54 to the reservoir side with respect to the inflow rate increases with the decrease in the oil temperature In other words, the increase in ratio of outflow rate to the increase in the inflow rate is increased with the increase in the oil temperature.

As described above, since the flow resistance of the working oil can be greatly changed by spiral choke 60 in accordance with the oil temperatures, the flow rate characteristic shown in FIG. 6 can be obtained as in the second embodiment. Accordingly, by increasing the controlled flow rate of the working oil in accordance with an increase in the oil temperature and inflow rate, the flow rate characteristic can be approximated to the ideal characteristic shown in FIG. 7. Therefore, also in the third embodiment, the oil temperature dependency of the controlled flow rate can effectively obtained. Further, the outflow rate characteristic can be changed in accordance with the inflow rate characteristic. As a result, in the four-wheel steering system shown in FIG. 1, the characteristic of rear-wheel steering angle corresponding to the vehicle speed can be kept substantially constant regardless of the oil temperatures.

What is claim is:

1. A flow control apparatus for a hydraulic system, comprising:
   inflow port means into which a working oil flows;
   outflow port means from which the working oil flows; and
   return port means for returning part of the working oil to the inflow side of the apparatus;
   elongate throttling path means comprising spiral choke means spirally extending between the inflow and outflow port means for causing the inflow port means to communicate with said outflow port means; and
   actuating valve means for opening the return port means when a difference in pressure between the inflow and outflow port sides of the throttling path means is higher than a predetermined value, and closing the return port means when the pressure difference is lower than the predetermine value.

2. An apparatus according to claim 1, which further comprises:
   a first pressure chamber communicating with the inflow port means;
   a second pressure chamber communicating with the outflow port means while communicating with the first pressure chamber through the throttling path means; and
   biasing means for biasing the actuating valve means in a direction for closing the return port means, said valve means being arranged to be actuated in response to a difference in pressure between the first and second pressure chambers.

3. An apparatus according to claim 2, which further comprises a third pressure chamber communicating with the second pressure chamber, said actuating valve means being arranged between the first and third pressure chambers so as to partition the first pressure chamber from the third pressure chamber, and said biasing means being arranged in the third pressure chamber.

4. A flow control apparatus for a hydraulic system, comprising:
   inflow port means into which a working oil flows;
   outflow port means from which the working oil flows; and
   return port means for returning part of the working oil to the inflow side of the apparatus;
   elongate throttling path means for causing the inflow port means to communicate with said outflow port means;
   actuating valve means for opening the return port means when a difference in pressure between the inflow and outflow port sides of the throttling path means is higher than a predetermined value, and closing the return port means when the pressure difference is lower than the predetermine value; and
   throttling path control means for shortening an effective length of the throttling path means in accordance with the actuating valve means in a direction for opening the return port means.

5. An apparatus according to claim 4, wherein said throttling path control means includes bypath means for connecting an intermediate portion of the throttling path means to the outflow port means, and bypath opening/closing means for interlocking with the displacement of the actuating valve so as to open and close the bypath means, and opening the bypath means when the pressure difference exceeds a predetermined value 6. An apparatus according to claim 4, wherein said throttling path means includes a sleeve arranged between the inflow and outflow port means, a choke body, which is slidably inserted into the sleeve and whose overlapping amount with the sleeve changes in accordance with sliding motion of the choke body, and spiral choke means formed between an inner periphery of the sleeve and an outer surface of the choke body and spirally extending so as to cause the inflow port means to communicate with the outflow port means, and has an effective length adapted to change in accordance with a change in the overlapping amount, said choke body being coupled to said actuating valve means so as to integrally move therewith and constituting said throttling path control means.

7. A flow control apparatus for a hydraulic system, comprising:
   inflow port means into which a working oil flows;
   outflow port means from which the working oil flows; and
   return port means for returning part of the working oil to the inflow side of the apparatus;
   elongate throttling path means for causing the inflow port means to communicate with said outflow port means;
   actuating valve means for opening the return port means when a difference in pressure between the inflow and outflow port sides of the throttling path means is higher than a predetermined value, and closing the return port means when the pressure difference is lower than the predetermine value; and
   a cylinder having first, second, and third pressure chambers therein, said inflow port means being formed in the cylinder and communicating with the first pressure chamber, said outflow port means being formed in the cylinder and communicating with the second pressure chamber, the second pressure chamber communicating with the first pressure chamber through the throttling path means and communicating with the third pressure chamber, said actuating valve means having a valve body, which is arranged in the cylinder to partition the first pressure chamber from the third pressure chamber and is displaced in accordance with a difference in pressure between the first and third pressure chambers, and said return port means being formed in the cylinder to communicate with the first pressure chamber when the valve body is displaced in a direction for opening the return port means.

8. An apparatus according to claim 7, which further comprises biasing means, arranged in the second pressure chamber, for biasing the valve body in a direction for closing the return port means.

9. An apparatus according to claim 7, wherein said throttle path means includes a sleeve arranged in the cylinder between the first and second pressure chambers, a choke body fitted in the sleeve, and a spiral choke formed between an inner periphery of the sleeve and an outer surface of the choke body, spirally extending and connecting the first pressure chamber to communicate with said second pressure chamber.

10. An apparatus according to claim 7, which further comprises:
   relief path means for connecting the return port means to the third pressure chamber, and a relief valve for opening the relief path means when a pressure in the third pressure chamber exceeds a predetermined value.

11. An apparatus according to claim 10, wherein said relief path means is formed in the vale body.

* * * * *